United States Patent Office 3,505,449
Patented Apr. 7, 1970

3,505,449
PRODUCTION OF A CYCLOSERINE-O-CARBAMYL-D-SERINE COMPOSITION
Roger L. Harned, Terre Haute, Ind., assignor to Commercial Solvents Corporation, New York, N.Y., a corporation of Maryland
No Drawing. Filed June 10, 1968, Ser. No. 735,515
Int. Cl. A61k 21/00
U.S. Cl. 424—123
8 Claims

ABSTRACT OF THE DISCLOSURE

A process for the production of a cycloserine-O-carbamyl-D-serine composition from a fermented beer containing them by adding an edible gum to the beer, adjusting the pH to within 11.2 to 11.8, readjusting the pH to within the range of 8.2 to 8.8, and recovering the composition, which has known utility as a growth promoter when given orally.

BACKGROUND OF THE INVENTION

This invention relates to the production of antibiotic compositions. In a particular aspect, this invention relates to a process for the production of an antibiotic composition containing cycloserine (CS) in combination with O-carbamyl-D-serine (OCS) suitable for oral administration to animals.

It is known that various antibiotics, including bacitracin, promote growth and increase feed efficiency of animals. It is also known that the activity of bacitracin in animals is potentiated by a combination of CS and OCS. However, when either CS or OCS alone, in an amount equivalent to that of the CS–OCS mixture, is administered with bacitracin, the growth promoting activity is not improved to the same extent as when the CS–OCS combination is administered with the bacitracin.

Cycloserine is a broad spectrum antibiotic possessing activity against both gram negative and gram positive bacteria. It is amphoteric, soluble in water and forms insoluble to partially soluble salts or complexes with silver, mercury, zinc and copper. Cycloserine is produced by fermentation utilizing cycloserine-producing strains of microorganisms of the genus Streptomyces such as *Streptomyces orchidaceous*, *Streptomyces virginiae*, and *Streptomyces lavendulae*. Several processes are available; namely, those of Harned, U.S. Patent 3,090,730; British Patent 768,007; and Shull et al., U.S. Patent 2,773,878.

The method of Harned, U.S. Patent 3,090,730 has been very successful for the production of cycloserine. According to this method, a cycloserine-producing microorganism of the genus Streptomyces is cultivated in an aqueous fermentation medium consisting of a carbohydrates source, a magnesium source, a potassium source, a phosphate source, an iron source, a zinc source, a manganese source, and a chemically defined nitrogen source at a temperature ranging from about 25° C. to about 37° C. for a period of from about three to five days wherein a ratio of carbohydrate to available nitrogen is maintained at about 10–20 to 1.

In the above process, O-carbamyl-D-serine is simultaneously produced. Its physical and chemical properties and method of preparation by the cultivation of *Streptomyces polychromogenus* are described in U.S. Patent 2,885,433. It slowly decomposes at elevated temperatures.

As previously described, cycloserine and O-carbamyl-D-serine have been found useful in combination with bacitracin in animal feed compositions. However, the use of CS–OCS in feeds has been greatly complicated by the fact that the stability of cycloserine in the presence of moisture is poor and it has been necessary to prepare the CS and OCS separately in a relatively pure state, then combine them in the desired proportions with the other feed ingredients immediately prior to feeding the animals to obtain the growth-promoting benefits. Previously it has not been feasible to prepare the CS–OCS combination in a single step due to high losses of CS; consequently, the CS–OCS composition has been relatively expensive to produce.

SUMMARY OF THE INVENTION

It is an object of this invention to provide a process for the production of an antibiotic composition.

A second object of this invention is to provide a process for the production of a crude cycloserine-O-carbamyl-D-serine composition suitable for oral administration to animals.

Other objects of this invention will be obvious to those skilled in the art from the disclosure herein.

It has now been discovered that the CS–OCS combination suitable for oral administration to animals can be produced economically in good yields. According to the new process, CS and OCS are formed in a nutrient fermentation medium in accordance with previous processes. After the fermentation is complete, an edible gum is added to the fermented medium, known as broth or, more commonly, as "beer" to those skilled in the art, the pH is adjusted when desired to within the range of from about 11.2 to 11.8, then reduced to within about 8.2 to 8.8. The mixture is then concentrated and dried by any suitable method.

DETAILED DESCRIPTION

The process of this invention can be used for the preparation of a CS–OCS combination from any fermentation medium containing suitable amounts of these two compounds. Preferably, the CS and OCS are prepared by fermentation according to the method of Harned, U.S. Patent 3,090,730 to provide a beer containing the dissolved CS and OCS. When the fermentation is complete, the beer either whole or filtered is delivered to a reaction vessel, the gum is added in an amount of about 1 to 1.5 gram or more per pound of beer, and the mixture is well agitated to insure thorough mixing. The pH is then preferably, but not necessarily, adjusted to within the range of from about 11.2 to about 11.8, preferably from 11.4 to 11.6. A pH of 11.5 is particularly preferred. The pH adjustment is effected by gradual addition accompanied by thorough agitation of finely ground calcium hydroxide or calcium oxide, either as the dry powder or as an aqueous suspension. The calcium compound used should be free from deleterious contaminants.

After addition of the calcium hydroxide or oxide is complete, the pH of the beer is adjusted to within about 8.2 to 8.8, preferably 8.4 to 8.6 with an acid having a pharmaceutically acceptable anion. A pH of 8.5 is particularly preferred. The beer is then preferably concentrated by evaporation at a pressure below about atmospheric pressure at a temperature of up to about 60° C. in an evaporator, generally to about 1.0% to 25%, preferably 20%, of the initial volume, and is then dried or recovered by any suitable means, e.g. by spray drying or drum drying. The resulting product is a relatively stable, free-flowing product, slightly hygroscopic at high humidities. It is packaged and stored for use in moisture-resistant containers to maintain the cycloserine concentration.

In one embodiment of the present invention, the step of adjusting the pH to within the range of 11.2 to 11.8 is omitted and instead the pH is adjusted to within the range of 8.2 to 8.8 using calcium hydroxide or calcium oxide. However, the preferred product is that obtained by first adjusting the pH to 11.2–11.8, then readjusting it to 8.2–8.8.

In a preferred embodiment of the present invention, the beer is filtered to obtain a higher concentration of CS–OCS in the final product. After filtering, the beer is generally treated with char (activated carbon) as is known to the art, then the antibiotic composition is recovered by concentrating the beer and spray drying the concentrate.

The term gum as used herein is intended to include, but not be limited to, those carbohydrate materials, generally of plant origin, or synthetic materials having similar properties which swell in water causing a thickening effect. Gums generally are edible hydrophilic colloids, but some types and grades are intended for non-edible uses. Such grades obviously are usually not suitable for the practice of this invention without some refinement. The term gum is also intended to include synthetic or semi-synthetic materials such as hydroxyethylated cellulose, polyvinyl pyrrolidone and sodium carboxymethyl cellulose. Natural products suitable for the practice of this invention include, but are not limited to, polysaccharides produced by the cultivation of the microorganism *Xanthamonas campestris* on a nutrient fermentation medium, dextrin, dextran, carrageenan, agar-agar, tragacanth, arabic and guar.

Mixtures of gums are also suitable for the practice of this invention.

The gum selected can be introduced in dry form and be dispersed throughout the beer by thorough agitation. Preferably however, the gum is dispersed in about 1 to 50 times its weight of water, and the concentrated dispersion is then incorporated in the beer. An excess of gum is not objectionable providing it does not form a gel prior to spray-drying.

The preferred gum used for the practice of this invention is sodium carboxymethyl cellulose. The sodium carboxymethyl cellulose used in the practice of this invention can be supplied by any suitable source of feed-grade quality material, inasmuch as the composition is intended for oral administration. The sodium carboxymethyl cellulose, if dry, is preferably dispersed in 1–2 volumes of water prior to addition to the beer to avoid lumping and poor dispersion. It is also available in solution form, and the solution is suitable for the practice of this invention. An excess over the preferred amount is not objectionable.

The acid used for pH adjustment should be of good quality, free from deleterious contaminants. Suitable acids include, but are not limited to, hydrochloric, sulfuric, phosphoric, acetic, propionic and butyric acids. Phosphoric, acetic and propionic are preferred, and acetic is particularly preferred.

The dried solids comprising the cycloserine and OCS antibiotic composition are administered orally to animals, to obtain the growth promoting benefits previously described. The composition can be administered in any suitable manner, many of which are known. One method contemplated is to add daily a predetermined effective amount to, for example, one day's feed rations and making it available to the animal or animals to be treated at their customary feeding stations. Other modes of administration will be obvious to those skilled in the art.

The following examples illustrate the invention. In these examples the beer was obtained from regular plant fermentation runs produced according to the following method.

*Streptomyces orchidaceous* was cultivated for a period of 24 hours at 30° C. in an aqueous seed culture medium of the following composition:

| | G./l. |
|---|---|
| Glucose | 10 |
| Soybean meal | 20 |
| Calcium carbonate | 2 |

A 9000-gallon portion of the following medium was then placed in a fermentor and the contents thereof sterilized for 15 minutes at 121° C.

| | Percent by weight |
|---|---|
| Glucose | 5 |
| $MgSO_4 \cdot 7H_2O$ | 0.05 |
| $K_2HPO_4$ | 0.05 |
| $FeSO_4 \cdot 7H_2O$ | 0.002 |
| $ZnSO_4 \cdot 7H_2O$ | 0.002 |
| $MnSO_4$ | 0.001 |
| Lard oil | 0.4 |

Sterile urea, 0.48%, was then added to the sterilized medium. The fermentor was inoculated with 800 gallons of seed culture prepared as above-described, and the medium was incubated at 30° C. for 86 hours, the medium being aerated at a rate of 800 cubic feet per minute. At the end of 86 hours, the fermentation was determined to be completed.

EXAMPLE 1

Fermented beer prepared as above was filtered and treated with activated carbon. It assayed 2.4 g./l. cycloserine, 2.2 g./l. O-carbamyl-D-serine, and had a total solids of 12 g./l. A 125 lb. portion of the filtered beer was delivered to a reaction vessel and powdered calcium hydroxide, 186 g., was gradually added with stirring until the pH was approximately 11.5. Glacial acetic acid, 190 g., was then added slowly until the pH was approximately 8.5. Sodium carboxymethyl cellulose, 150 g., was slurried in 6 liters of water and was added to the beer. The mixture was then concentrated to about 18 lb. in an evaporator at reduced pressure in a period of about 120 minutes. The resulting mixture was then spray dried in a period of about 65 minutes resulting in 630 g. of product having 8.63% by wt. cycloserine and 12.3% O-carbamyl-D-serine, corresponding to a recovery of 70% of the CS and 101% of the OCS.

A portion of the dried material was packaged in sealed vials and stored at 45° C. to evaluate the thermal stability. The following data were obtained.

| Time Weeks | Percent of Original | |
|---|---|---|
| | CS | OCS |
| 2 | 108 | 102 |
| 4 | 95 | 83 |
| 6 | | 81 |

This is a very severe test and the sample was determined to have satisfactory stability.

EXAMPLE 2

The experiment of Example 1 is repeated except that the pH is adjusted to within the range of 8.2–8.8 with calcium hydroxide. A good recovery of the CS–OCS composition is obtained.

EXAMPLE 3

The experiment of Example 1 is repeated except that whole fermented beer containing the cells of the microorganism is substituted for filtered beer and the antibiotic composition is recovered in good yield by drum drying.

EXAMPLE 4

The experiment of Example 1 is repeated except that hydrochloric acid is substituted for acetic acid. A high yield of the CS–OCS composition is obtained.

EXAMPLE 5

The experiment of Example 1 is repeated except that phosphoric acid is substituted for acetic acid. A high yield of the CS–OCS composition is obtained.

EXAMPLE 6

The experiment of Example 1 is repeated except that propionic acid is substituted for acetic acid. A high yield of the CS–OCS composition is obtained.

EXAMPLE 7

The experiment of Example 1 is repeated except that butyric acid is substituted for acetic acid. A high yield of the CS–OCS composition is obtained.

EXAMPLE 8

The experiment of Example 1 is repeated except that sulfuric acid is substituted for acetic acid. A high yield of the CS–OCS composition is obtained.

EXAMPLES 9–18

The experiment of Example 1 is repeated except that the gums listed below are substituted for sodium carboxymethyl cellulose. A high yield of the CS–OCS combination is obtained in each example.

| Example No.: | Gum |
| --- | --- |
| 9 | Hydroxyethylated cellulose. |
| 10 | Polyvinyl pyrrolidone. |
| 11 | Polysaccharide from *X. campestris*. |
| 12 | Dextrin. |
| 13 | Dextran. |
| 14 | Carrageenan. |
| 15 | Agar-agar. |
| 16 | Tragacanth. |
| 17 | Arabic. |
| 18 | Guar. |

I claim:

1. A process for the production of an antibiotic composition from a fermented beer containing cycloserine and O-carbamyl-D-serine comprising the steps of:
   (a) adding to said beer an edible gum selected from the group consisting of sodium carboxymethyl cellulose, hydroxyethylated cellulose, polyvinyl pyrrolidone, polysaccharide from *X. campestris*, dextrin, dextran, carrageenan, agar-agar, tragacanth, arabic and guar in a ratio of from 1 to 1.5 gram per pound of said beer,
   (b) adjusting the pH of said beer to within the range of from 11.2 to 11.8 with calcium hydroxide or calcium oxide,
   (c) adjusting the pH to within the range of from 8.2 to 8.8 with an acid having a pharmaceutically acceptable anion,
   (d) concentrating said beer at a temperature of up to about 60° C. at a pressure below atmospheric pressure to effect a reduction in volume of said beer to from about 1.0% to about 25% of the initial volume to produce a concentrated medium, and
   (e) drying said beer to produce said antiobiotic composition.

2. A process for the production of an antibiotic composition from a fermented beer containing cycloserine and O-carbamyl-D-serine comprising the steps of:
   (a) adding to said beer sodium carboxymethyl cellulose in a ratio of from 1 to 1.5 gram per pound of said beer,
   (b) adjusting the pH of said beer to within the range of from 11.2 to 11.8 with calcium hydroxide or calcium oxide,
   (c) adjusting the pH to within the range of from 8.2 to 8.8 with an acid having a pharmaceutically acceptable anion,
   (d) concentrating said beer at a temperature of up to about 60° C. at a pressure below atmospheric pressure to effect a reduction in volume of said beer to from about 1.0% to about 25% of the initial volume to produce a concentrated medium, and
   (e) drying said beer to produce said antibiotic composition.

3. The process of claim 2 wherein said beer is filtered and the said composition is recovered by spray drying the said beer.

4. The process of claim 3 wherein the said acid is selected from the group consisting of hydrochloric, sulfuric, phosphoric, acetic, propionic, and butyric.

5. The process of claim 2 wherein the pH is adjusted to within the range of 11.4 to 11.6 in step (b) and to within the range of 8.4 to 8.6 in step (c).

6. The process of claim 2 wherein the said beer is whole beer containing cells of the CS–OCS producing microorganism and the said composition is recovered by drum drying.

7. A process for the production of an antibiotic composition from a fermented beer containing cycloserine and O-carbamyl-D-serine comprising the steps of:
   (a) adding to said beer sodium carboxymethyl cellulose in a ratio of from 1 to 1.5 gram per pound of said beer,
   (b) adjusting the pH to within the range of from 8.2 to 8.8 with calcium oxide or calcium hydroxide,
   (c) concentrating said beer at a temperature of up to about 60° C. at a pressure below atmospheric pressure to effect a reduction in volume of said beer to from about 1.0% to about 25% of the initial volume to produce a concentrated medium, and
   (d) drying said beer to produce said antibiotic composition.

8. The process of claim 7 wherein said beer is filtered and the said composition is recovered by spray drying the said beer.

References Cited

UNITED STATES PATENTS

| 2,773,878 | 12/1956 | Shull et al. | 424—116 |
| 2,885,433 | 5/1959 | Hagemann et al. | 424—300 |
| 3,090,730 | 5/1963 | Harned | 195—80 |

ALBERT T. MEYERS, Primary Examiner

D. M. STEPHENS, Assistant Examiner

U.S. Cl. X.R.

424—116, 300; 260—482, 307